US009081947B2

(12) United States Patent
Dewan et al.

(10) Patent No.: US 9,081,947 B2
(45) Date of Patent: Jul. 14, 2015

(54) TURING TEST BASED USER AUTHENTICATION AND USER PRESENCE VERIFICATION SYSTEM, DEVICE, AND METHOD

(75) Inventors: Prashant Dewan, Hillsboro, OR (US); David M. Durham, Beaverton, OR (US); Ling Huang, Union City, CA (US); Karanvir S. Grewal, Hillsboro, OR (US); Xiaozhu Kang, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 64 days.

(21) Appl. No.: 13/976,918

(22) PCT Filed: Dec. 27, 2011

(86) PCT No.: PCT/US2011/067367
§ 371 (c)(1),
(2), (4) Date: Jun. 27, 2013

(87) PCT Pub. No.: WO2013/100898
PCT Pub. Date: Jul. 4, 2013

(65) Prior Publication Data
US 2014/0230046 A1   Aug. 14, 2014

(51) Int. Cl.
*G06F 21/32* (2013.01)
*G06K 9/78* (2006.01)
*G06K 9/00* (2006.01)

(52) U.S. Cl.
CPC ............ *G06F 21/32* (2013.01); *G06K 9/00288* (2013.01); *G06K 9/00899* (2013.01)

(58) Field of Classification Search
CPC ......... G06F 21/30; G06F 21/31; G06F 21/32; G06F 21/40; G06F 21/36
See application file for complete search history.

(56) References Cited

U.S. PATENT DOCUMENTS

| 7,986,816 B1 * | 7/2011 | Hoanca et al. ................ 382/115 |
| 2006/0210261 A1 * | 9/2006 | Kakiuchi et al. .............. 396/155 |

(Continued)

FOREIGN PATENT DOCUMENTS

| JP | 11-339048 A | 12/1999 |
| JP | 2002-236666 A | 8/2002 |

(Continued)

OTHER PUBLICATIONS

Non-Final Office Action received for U.S. Appl. No. 13/631,288, mailed on Jun. 13, 2014, 13 pages.

(Continued)

*Primary Examiner* — Gilberto Barron, Jr.
*Assistant Examiner* — Arya Golriz
(74) *Attorney, Agent, or Firm* — Barre Law Firm, PLLC

(57) ABSTRACT

A password-less method for authenticating a user includes capturing one or more images of a face of the user and comparing the one or more images with a previously collected face template. Randomly selected colored light and randomized blinking patterns are used to capture the images of the user. Such captured images are compared to previously collected face templates, thereby thwarting spoof attacks. A secret image, known only to the user and the device, is moved from one area of the display to another randomly selected area, using the movements of the user's head or face, thereby providing a Turing based challenge. Protected audio video path (PAVP) enabled devices and components are used to protect the challenge from malware attacks.

27 Claims, 5 Drawing Sheets

(56) References Cited

U.S. PATENT DOCUMENTS

| | | | |
|---|---|---|---|
| 2008/0098229 | A1 | 4/2008 | Hartrell et al. |
| 2010/0027853 | A1 | 2/2010 | Wen et al. |
| 2012/0209614 | A1 | 8/2012 | Kaburlasos et al. |
| 2013/0268777 | A1 | 10/2013 | Grobman et al. |
| 2014/0096068 | A1 | 4/2014 | Dewan et al. |
| 2014/0157410 | A1 | 6/2014 | Dewan et al. |

FOREIGN PATENT DOCUMENTS

| | | | |
|---|---|---|---|
| JP | 2003-030659 | A | 1/2003 |
| JP | 2004-252955 | A | 9/2004 |
| JP | 2004-306821 | A | 11/2004 |
| JP | 2005308966 | A | 11/2005 |
| JP | 2006-259923 | A | 9/2006 |
| JP | 2010-182056 | A | 8/2010 |
| KR | 100320626 | B1 | 1/2002 |
| KR | 10-2008-0003299 | A | 1/2008 |
| KR | 100003299 | A | 1/2008 |
| WO | 20101147823 | A1 | 12/2010 |
| WO | 20131100898 | A1 | 7/2013 |

OTHER PUBLICATIONS

Intel, "Blu-ray Disc* Playback on Intel Graphics FAQ", retrieved on Aug. 6, 2014, 3 pages. retrieved from http://www.intel.com/support/graphics/sb/CS-029871.htm.

International Preliminary Report on Patentability and Written Opinion received for PCT Patent Application No. PCT/US2011/067367, mailed on Jul. 10, 2014, 5 pages.

Toth, Bori, "Biometric Liveness Dectection", Information Security Bulletin, vol. 10, Oct. 2005, pp. 291-297.

Wikipedia, the Free Encyclopedia, "Multi-factor Aunthentication", retrieved on Aug. 6, 2014, 20 Pages.

Wikipedia, the Free Encyclopedia, "Gesture Recognition", edited Mar. 5, 2012, 6 pages. retrieved from: http://en.wikipedia.org/w/index.php?title=Gesture_recognition&oldid=480270042.

International Search Report and Written Opinion, Sep. 14, 2012, 8 pages, International Application No. PCT/US2011/067367, Korean Intellectual Property Office, Metropolitan City, Korea.

Final Office Action received for U.S. Appl. No. 13/631,288, mailed on Dec. 29, 2014, 14 pages.

Kang, Xiaozhu, "Methods and Apparatus for Multi-factor User Authentication with Two Dimensional Cameras", U.S. Appl. No. 14/492,163, mailed on Sep. 22, 2014, 38 pages.

Notice of Allowance received for U.S. Appl. No. 13/631,288, mailed on May 18, 2015, 10 pages.

Office Action received for Japanese Patent Application No. 2014-550247, mailed on May 19, 2015, 3 pages of English Translation and 1 pages of Japanese Office Action.

\* cited by examiner

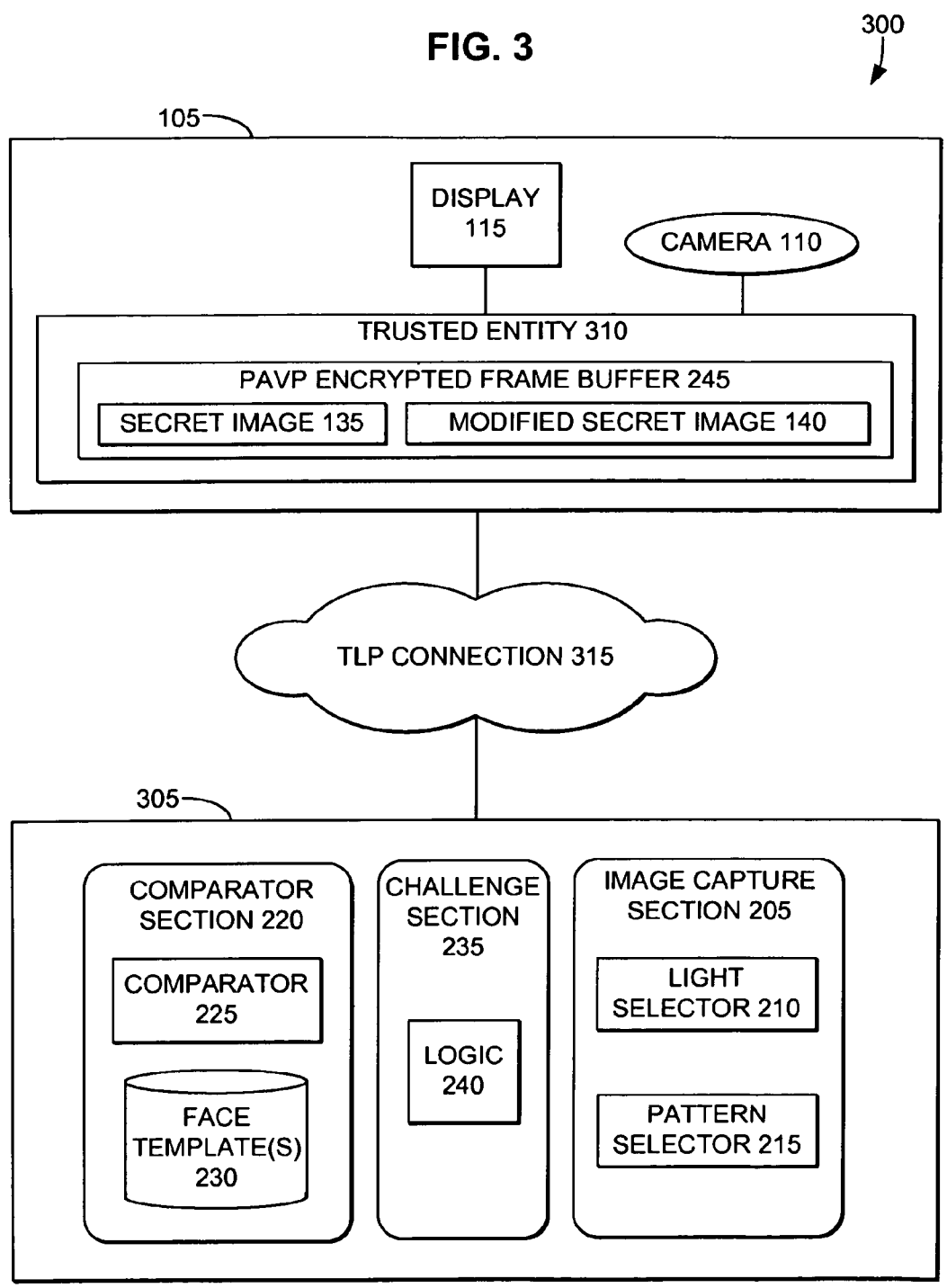

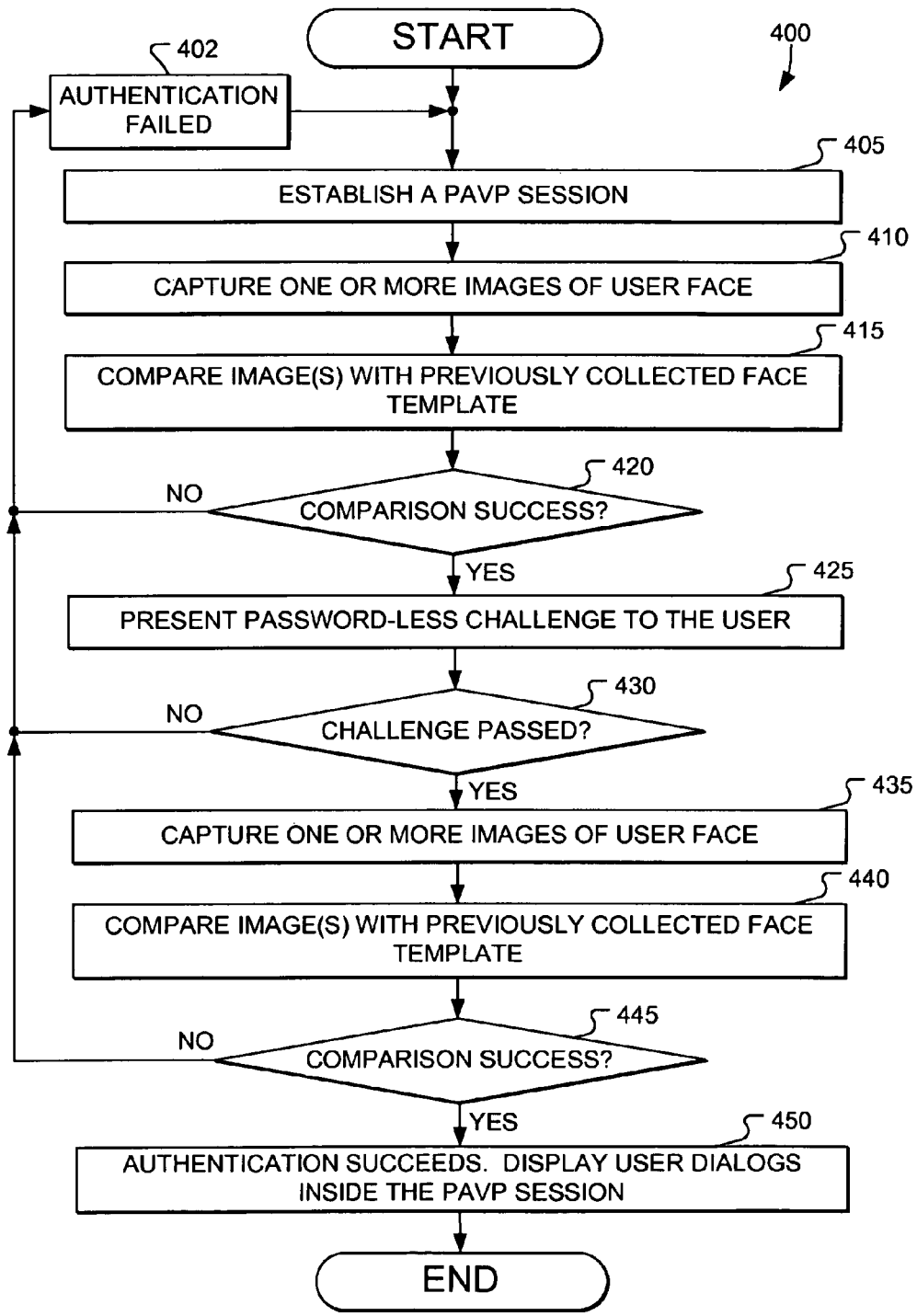

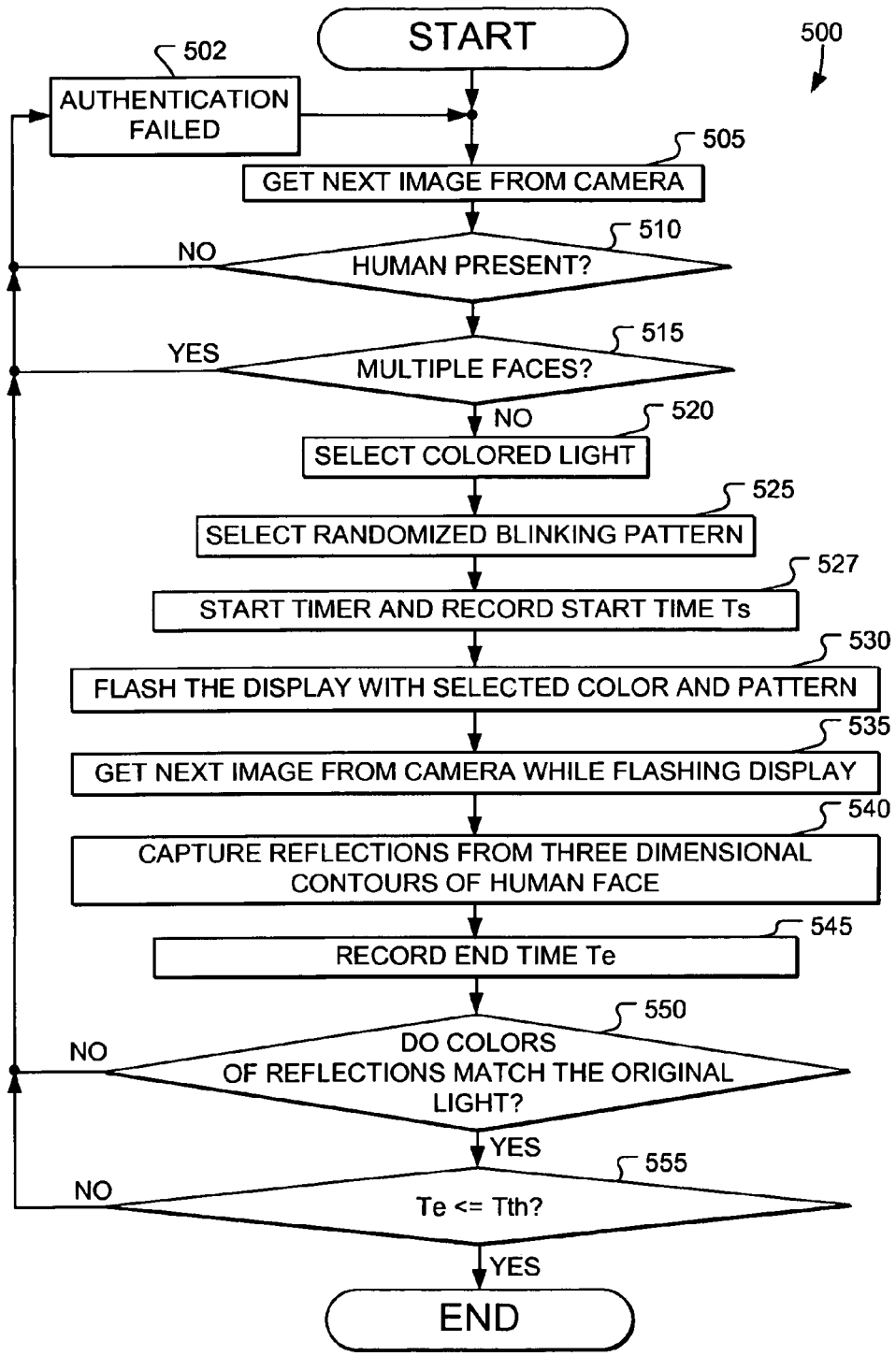

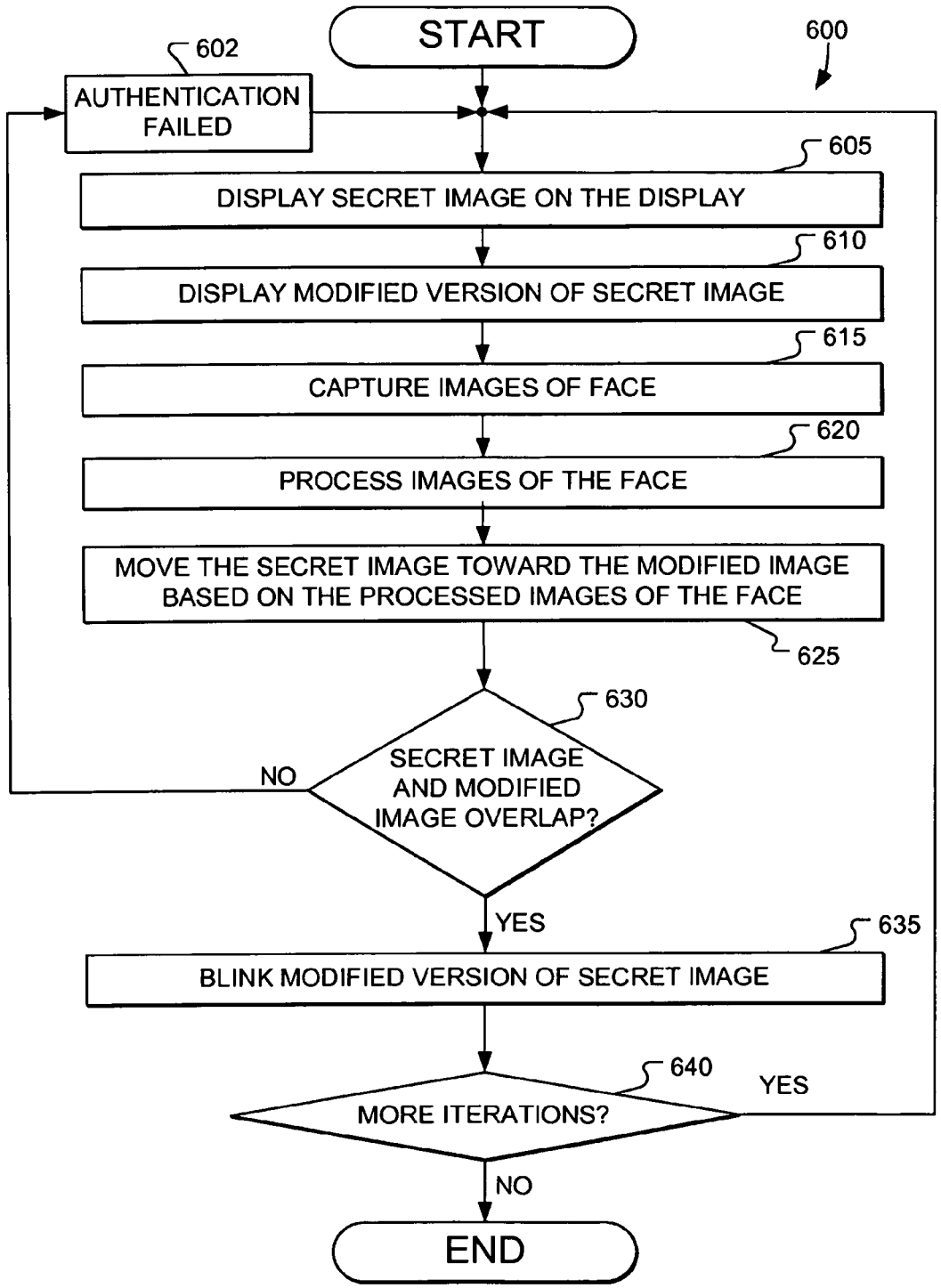

US 9,081,947 B2

TURING TEST BASED USER AUTHENTICATION AND USER PRESENCE VERIFICATION SYSTEM, DEVICE, AND METHOD

TECHNICAL FIELD

Embodiments generally relate to user authentication, and more particularly, to password-less biometric challenge-based user authentication.

BACKGROUND

User authentication is a key component of modern computerized devices such as computers, laptops, tablets, smart phones, personal digital assistants (PDAs), and the like. Conventionally, passwords have been used for user authentication. However, hacking techniques are becoming more sophisticated and passwords can be cracked.

Alternative forms of authentication include soft biometrics such as face recognition. But current face recognition technologies are vulnerable to replay attacks and are easily confused or otherwise bypassed by clever users. For example, hackers today can use a photograph of the authorized user to fool the face recognition algorithms. By way of another example, a highly motivated adversary might use a computer simulated 3D face rendered on a display facing the camera such that the adversary can control the 3D face and the response, thereby illegitimately gaining access to the device.

Accordingly, a need remains for improved biometric based authentication procedures. It would be desirable to provide password-less and biometric theft resistant user authentication. Such authentication procedures should be capable of discerning the difference between three dimensional contours of a human face and a flat surface, and should include Turing test based user authentication protocols and user presence verification elements, thereby significantly reducing the attack space.

BRIEF DESCRIPTION OF THE DRAWINGS

Embodiments of the present invention are illustrated by way of example, and not by way of limitation, in the drawings and in which like reference numerals refer to similar elements.

FIG. 3 illustrates a block diagram of a Turing test based user authentication and user presence verification system, according to another example embodiment of the present invention.

FIG. 4 illustrates a flow diagram of a technique for password-less and biometric theft resistant user authentication, according to yet another example embodiment of the present invention.

FIG. 5 illustrates a flow diagram of a technique for capturing images of a human face, according to some aspects of the technique of FIG. 4.

FIG. 6 illustrates a flow diagram of a Turing test based user challenge, according to some aspects of the technique of FIG. 4.

DETAILED DESCRIPTION

Reference will now be made in detail to embodiments of the invention, examples of which are illustrated in the accompanying drawings. In the following detailed description, numerous specific details are set forth to enable a thorough understanding of the present invention. It should be understood, however, that persons having ordinary skill in the art may practice the present invention without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first image could be termed a second image, and, similarly, a second image could be termed a first image, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of a device and method for password-less Turing test based biometric user authentication and user presence verification, associated processes for using such device, and associated systems with which such device and method can be used, are described. The Turing test based challenge is protected using protected audio video path (PAVP), and reduces the attack space by making the user respond to randomized challenges via a protected display output, hence making it extremely difficult or impossible for programmed malware or other attackers from subverting the authentication. Image capture and facial recognition algorithms, using randomized reflection analysis techniques, further enhance the security and accuracy of the authentication processes.

Figure 1:
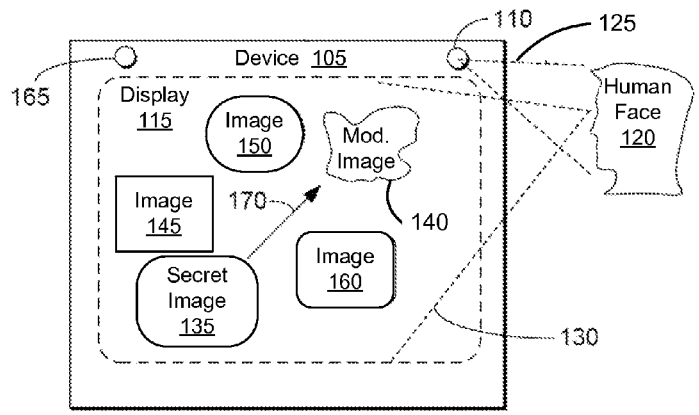
FIG. 1 illustrates a diagram of a Turing test based user authentication and user presence verification device, according to an example embodiment of the present invention.
Figure 2:
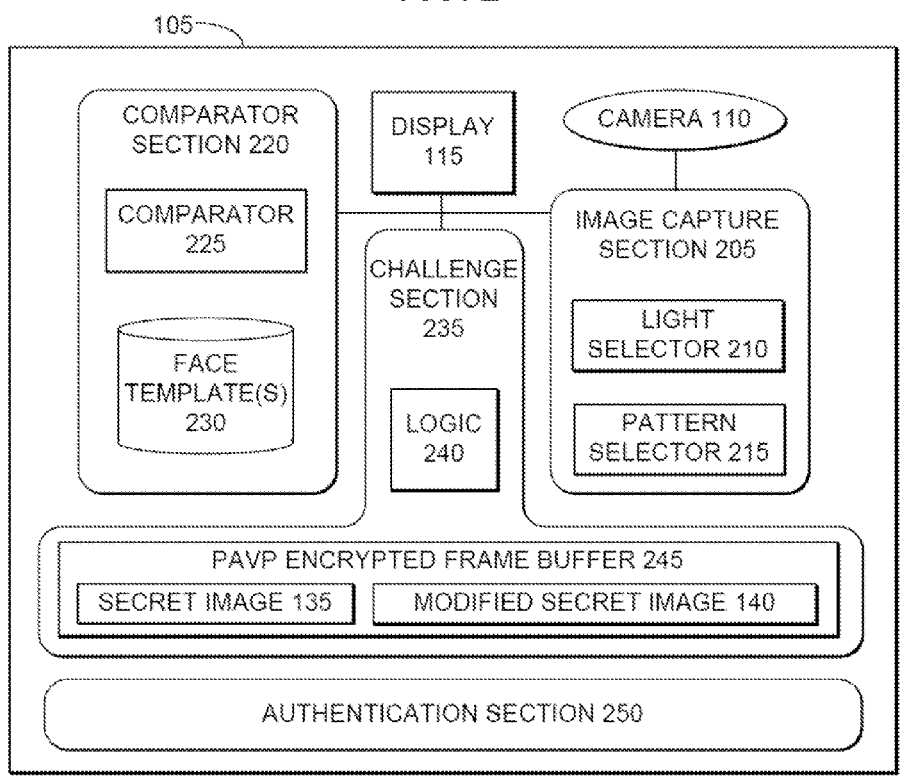
FIG. 2 illustrates a block diagram of components of the device of FIG. 1.

FIG. 1 illustrates a diagram of a Turing test based user authentication and user presence verification device 105, according to an example embodiment of the present invention. FIG. 2 illustrates a block diagram of components of the device 105 of FIG. 1. Reference is now made to FIGS. 1 and 2.

The device 105 can include a display 115 and a visible light camera 110. The camera 110 can be capable of capturing one or more images, frames, video streams, and the like. The camera 110 can be of the type typically used on a personal computer. The display can be operated using a secure display technology, such as PAVP. The device 105 can be a computer, laptop, tablet, smart phone, personal digital assistant (PDAs), or any other similar computerized device.

Preferably, a human face 120, which is sometimes referred to herein as a user 120 or a user's face 120, is within the purview 125 of the camera 110. The display 115 is within the purview 130 of the user 120.

The display 115 can present various images to the user 120 as part of a Turing test based user authentication challenge. For example, the Turing test based user authentication challenge uses secret image 135, modified secret image 140, and can also use other images (e.g., 145, 150, and 160), as part of the overall authentication of the user 120, as explained in detail below.

The device 105 can include an image capture section 205 for capturing one or more images of the user's face 120 using the camera 110. The image capture section 205 can include a colored light selector 210 and a pattern selector 215. The colored light selector 210 can randomly select a colored light from multiple colored light options. The display 115 can flash the randomly selected colored light at the same time that one or more images are captured using the camera 110. Alternatively, flash 165 can flash the randomly selected colored light at the same time that one or more images are captured using the camera 110. In other words, the image capture section 205 can capture one or more images of the user's face 120 while the display 115 or the flash 165 flashes the randomly selected colored light.

It will be understood that the flash 165 can be a programmable LED flash, which can be programmed for duration, hue, color, luminance, and intensity of the flash. It will be also be understood that the flash 165 can be inbuilt (i.e., built into the device 105), or external from but connected to the device 105.

Such colored light throws off reflections from the contours of the human face in a certain hue. The user 120 does not know which hue will be selected by the device 105, which could be one of potentially hundreds or thousands of color options. The images that are then captured of the user's face, with the particular colored reflections, are later compared to previously collected face templates 230, as explained in further detail below. In other words, the captured images of the face are processed and tested for the presence of the colored light reflections in order to establish user presence and to also thwart any photo based attacks. In this manner, one possible line of attack by hackers is prevented because it would be difficult or impossible for an adversary to have hundreds or thousands of photographs of the legitimate user, each having a different faked hue, let alone know which photograph to hold up and when in front of the camera.

In some embodiments, the camera 110 can capture images of reflections of the rendered display 115 in one or more of the user's 120 eyes at a, given distance, and test the captured images of the eyes for the liveliness of the user being authenticated by looking for the reflection of the rendered display 115. This provides yet another defense to those who might try to spoof the authentication using face masks, photographs, or other "non-live" objects.

The pattern selector 215 can select or otherwise determine a randomized blinking pattern. The display 115 can be flashed in accordance with the randomized blinking pattern. The image capture section 205 can capture reflections from the three dimensional contours of the user's face 120 while the display 115 flashes the randomized blinking pattern with the randomly selected colored light.

In this manner, it can be determined whether the face is a three dimensional human face, or instead, a two dimensional video screen or photograph. Because the blinking causes shadows and discontinuous boundaries as the light interacts with the "real" face and its edges, the image capture section 205 and/or other components of the device 105 such as the comparator 225 of the comparator section 220, can determine a real human face from a fake. The comparator 225 of the comparator section 220 can compare one or more images captured using the camera 110 with one or more previously collected and stored face templates 230.

For example, after an image of the user 120 is captured, the image is tested for the presence of the correct reflections from the user's face from the original, expected randomized blinking light, contrast, and/or brightness change sequence. Even if an adversary or other imposter were to go to the extent of building and using an animatronics robot, donning a lookalike facemask, or attempting other similar spoofing attacks, the attack would nevertheless fail because of the Turing based challenge, described in further detail below.

After matching the face of the user 120 with the previously collected face template 230, the face of the user can be continually tracked within the purview 130 of the camera 110. In other words, the device can implement face tracking to keep the association with the particular user 120 as they move freely within the camera's view. If more than one human face appear in any of the captured images, the authentication fails and is restarted. Similarly, if no human face appears in one or more of the captured images, the authentication fails and is restarted.

Furthermore, the image capture section 205 can estimate the distance between the display 115 and the face of the user 120 based on the captured reflections, thereby obviating the need of an expensive infrared emitter and receiver. The latency between the moment of each flash of the display 115 and the moment the camera 110 observes the reflections from the face 120 can be determined. Such latency will generally be on the order of microseconds. The latency can then be verified with a predefined expected threshold latency.

If the measured latency deviates significantly from the expected threshold latency, then the authentication fails and the user can be forced to restart the authentication process. For example, a timer can be started at Ts, which is at or just before the moment of the flash. A threshold time Tth can be determined by adding the expected threshold latency to Ts, or in other words, Tth=Ts+expected threshold latency. An end time, Te, can be recorded at or about the end of capturing the reflections. If Te is less than or equal to Tth, then there is a high likelihood that genuine reflections of a human face 120 were observed. Otherwise, if the timer reaches the threshold latency Tth before the capturing the reflections, then there is a high likelihood that there is an attempt being made to hack or spoof the device, and the authentication is restarted.

This assures that an adversary can not use a second camera to record the flash pattern and then replay or otherwise integrate the secondary images into a virtual rendering of a person's face on another computer display. Verifying the latency of the flash reflection to camera observation detects any delay loop due to added equipment used by an adversary to spoof the face recognition based login. If a second system is used in such manner, it would be unlikely that the spoofing system could match such timing constraints.

A challenge section 235 can include logic 240 for presenting a password-less Turing based challenge to the user 120 on the PAVP enabled display 115. The challenge section 235 can further include a PAVP encrypted frame buffer 245 to store a secret image 135 and a modified version 140 of the image. PAVP further enhances the security of the Turing based challenge. For example, a PAVP session can be established on the PAVP enabled device, which can be of Type A or Type B, as further described below. When the face of the user is recognized and matched with the previously collected face template, the user's face can be "bound" to the PAVP enabled device, thereby confirming that the user is present and associated with a specific platform, or in other words, with that particular device. Because PAVP authenticates the device, the user's presence is effectively bound to that particular PAVP device.

Even if an attacker steals biometric credentials or user face templates, the attacker cannot replay them to gain illegitimate access to the device because the PAVP approach prevents the attacker from gaining access to the secure display. Nor can the attacker gain access to the secret image because it is inaccessible to entities not privy to the PAVP encrypted frame buffer 245. In other words, PAVP protects the contents of the image so it cannot be stolen by malware running on the device 105, as such malicious software would not be able to intercept the PAVP encrypted frame buffer to retrieve the secret image.

Further, the Turing challenge is a visual challenge, and is protected with PAVP such that a software module cannot maliciously intercept the challenge nor respond to it because such malicious code has no access to the display contents. Performing the Turing challenge through the PAVP enabled device further proves that the user is present and not merely a photograph or computer rendering of the user, which cannot respond to the Turing challenges provided through the PAVP protected display.

Moreover, the secret image 135 is a shared secret with the user 120. In other words, the user 120 previously selects the secret image 135 during a setup procedure, and the secret image is known only to the user 120 and the challenge section 235.

The challenge section 235 displays the secret image on the PAVP enabled display 115 and moves the secret image 135 toward the modified version 140 of the secret image, as shown by arrow 170, in response to movement of the user's face 120. For example, if the captured images show that the user's face 120 is moving, then the secret image 115 will move in accordance with those movements. In this manner, the user 120 can cause the secret image 135 to move to the modified version 140 of the secret image, even causing the secret image to overlap with the modified version of the secret image.

The modified version 140 can be morphed, blurred, dashed, or the like, or include other suitable modifications from the actual secret image 135. It will be understood that the modified version 140 can be as little as a dot or other icon or indicator. The modified version 140 can be placed at a randomly decided location on the display 115 so that each challenge is different from the preceding one.

When the secret image is overlapped with the modified secret image, the modified secret image can blink, thereby indicating a successful result of the Turing challenge. Additional iterations can be presented if further authentication is desired. In other words, once the user moves his/her head, thereby moving the secret image over the modified secret image, the modified secret image can flash and then the modified secret image is relocated for the next iteration of the challenge response. After N iterations, the user's face is recognized again and if all the challenges and the facial recognition checks are successful, then the user is authenticated and presence before the PAVP enabled device 105 is verified.

The PAVP enabled display 115 can display additional images such as 145, 150, and 160, or any number of additional images, either morphed or not, on the display 115 to make it sufficiently difficult for the user 120 to choose the correct secret image from among the images, and to move the correct secret image to the correct morphed image. In this manner, to be successful, the user 120 has pre-knowledge of the secret image and must also have a real human face capable of directing the secret image across the display 115 to the correctly designated location.

An authentication section 250 authenticates the user 120 in response to a successful result of the comparator section 220 and the challenge section 235. In other words, if the comparator section 220 successfully matches the face of the user 120 with the previously collected face template 230, and the challenge section 235 confirms that the password-less challenge is passed, then the user is granted authorized access to the device.

FIG. 3 illustrates a block diagram of a Turing test based user authentication and user presence verification system 300, according to another example embodiment of the present invention. The system can include the device 105 and a remote server 305. The device 105 can include the display 115, the camera 110, and, a local trusted entity 310. A transport layer security (TLS) connection can be established between the remote server 305 and the local trusted entity 310. The local trusted entity 310 can include or otherwise be associated with the encrypted frame buffer 245, which can store the secret image 135 and/or the modified version 140 of the secret image. PAVP sessions can be established in either "Type A" or "Type B" arrangements.

In a "Type A" session, a PAVP session is established with the remote server 305, and protected surfaces of the display 115 of the client device 105 are presented to the user 120 through the PAVP session. The user's input and the server's output are protected even when the client device 105 is infected with malware. If the malware tries to steal any part of the surface of the display 115, the malware will only get an Advanced Encryption Standard (AES) encrypted surface, or other suitably encrypted surface.

In a "Type B" session, a PAVP session is established with the local trusted entity 310 on the client device 105. The trusted entity 310 composes the surface of the display 115 on behalf of the remote server 305. The user's input and the server's output are protected because the local trusted entity 310 establishes a secure channel with the remote server 305 using the TLS connection and with the display 115 using PAVP.

The remote server 305 can include the comparator section 220, the challenge section 235, and the image capture section 205, and may receive and process images and other information received from the client device 105 over the TLP connection 315. The remote server 305 may transmit information such as where the secret image should be located on the display 115, whether the images of the user's face match a face template, the randomized color light or pattern, and so forth, to the client device 105. The client device 105 can then interface with the user 120 to complete the challenge.

FIG. 4 illustrates a flow diagram 400 of a technique for password-less and biometric theft resistant user authentication, according to yet another example embodiment of the present invention. The technique begins at 405, where a PAVP session is established. At 410, one or more images of the user's face are captured. At 415, the image(s) are compared with one or more previously collected face templates. A determination is made at 420 whether the comparison is successful, or in other words, whether there is a match. If NO, the authentication fails at 402 and is restarted. Otherwise, if YES, the flow proceeds to 425 where the user is presented with a password-less Turing based challenge.

A determination is made at 430 whether the user has successfully passed the challenge. If NO, the authentication fails at 402 and is restarted. Otherwise, if YES, meaning the user successfully passes the challenge at 430, then the flow proceeds to 435 where one or more additional images are captured of the user's face. At 440, the additional images are compared with the previously collected face templates. A determination is made at 445 whether this comparison is successful. If NO, the authentication fails at 402 and is restarted. Otherwise, if YES, then the authentication succeeds and the flow proceeds to 450 where user dialogs are displayed inside the PAVP session to the user.

It will be understood that the various blocks of the flow diagram 400 need not occur in the order presented, but are illustrated in such order for exemplary purposes.

FIG. 5 illustrates a flow diagram 500 of a technique for capturing images of a human face, according to some aspects of the technique of FIG. 4. The techniques described in FIG. 5 can correspond, for example, to 410 and/or 435 of FIG. 4.

The technique begins at 505, where a next image is received from the camera. At 510, a determination is made whether a human is present in the image. Such determination can be made, for example, using the image capture section 205 and/or the comparator section 220. If NO, the authentication fails at 502 and is restarted. Otherwise, if YES, the flow proceeds to 515, where another determination is made whether there are multiple human faces in any of the captured images. If YES, the authentication fails at 502 and is restarted. Otherwise, if NO, the flow proceeds to 520.

At 520, a colored light is randomly selected from multiple colored light options. At 525, a randomized blinking pattern is selected. At 527, a timer is started and the start time Ts is recorded, which is at or just before the moment of the flash. At 530, the display is flashed with the randomly selected colored light and in accordance with the randomized blinking pattern. At 535, the next image from the camera is obtained while flashing the display. At 540, reflections are captured from three dimensional contours of the face of the user while the display is being flashed, thereby discerning flat surfaces from the three dimensional contours of the face.

At 545, the end time Te is recorded, which is at or about the end of capturing the reflections. At 550, a determination is made whether the colors of the reflections from the face match the color of the original light that was flashed. If NO, the authentication fails at 502 and is restarted. Otherwise, if YES, the flow proceeds to 555. If the measured latency deviates significantly from the expected threshold latency, then the authentication fails and the user can be forced to restart the authentication process.

For example, a threshold time Tth can be determined by adding the expected threshold latency to Ts, or in other words, Tth=Ts+expected threshold latency. If Te is less than or equal to Tth, as tested at 555, then there is a high likelihood that genuine reflections of a human face 120 were observed, and the authentication proceeds. Otherwise, if timer reaches the threshold latency Tth before the capturing the reflections, or in other words, the end time Te is greater than the threshold time Tth, then the determination at 555 fails, and there is a high likelihood that there is an attempt being made to hack or spoof the device. Therefore, the NO path is taken and the authentication fails at 502 and is restarted.

It will be understood that the various blocks of the flow diagram 500 need not occur in the order presented, but are illustrated in such order for exemplary purposes.

FIG. 6 illustrates a flow diagram 600 of a Turing test based user challenge, according to some aspects of the technique of FIG. 4. The techniques described in FIG. 6 can correspond, for example, to 425 of FIG. 4.

The technique begins at 605, where a secret image is displayed at a random location on the display. At 610, a modified version of the secret image is displayed at a random location on the display. At 615, one or more images of the user's face are captured. At 620, the captured images are processed. At 625, the secret image is moved toward the modified secret image based on the processed images of the face, or in other words, based on the movements of the user's face and/or head.

A determination is made at 630 whether the secret image substantially overlaps the modified secret image. This determination can be based on an elapsed period of time or other criteria. If NO, meaning the secret image did not overlap the modified secret image within the required period of time or within other suitable criteria, then the authentication fails at 602 and is restarted. Otherwise, if YES, meaning the challenge was successfully completed, then the flow proceeds to 635, where the modified secret image can be blinked to indicate the successful completion of the challenge. At 640, a determination is made whether more iterations of the challenge are desired or otherwise required. If YES, the flow returns to 605 and repeats. Otherwise, if NO, the Turing based challenge portion of the authentication procedure is successfully completed.

Although particular embodiments have been described, it will be appreciated that the principles of the invention are not limited to those embodiments. The inventive concepts described herein can be included within general purpose computers, tablets, smart phones, ultrabooks, servers, or the like. Embodiments disclosed herein provide secure and reliable devices, methods, and systems for password-less user authentication and user presence verification.

In some embodiments, an article drawn from the set of media including floppy disks, optical disks, fixed disks, volatile memory, non-volatile memory, random access memory, read-only memory, or flash memory, comprising a machine-accessible medium having associated non-transitory instructions that, when executed in a test and measurement device, results in a machine performing the steps of the various embodiments of the invention as disclosed herein. Other variations and modifications may be made without departing from the principles of the invention as set forth in the following claims.

What is claimed is:

1. One or more non-transitory computer-readable media storing computer-executable instructions that, when executed by a processor, operate to perform a password-less method for authenticating a user, the method comprising:
   capturing one or more first images of a face of a user;
   comparing the one or more first images with a previously collected face template;
   capturing one or more second images of the face of the user;
   presenting a password-less challenge to the user on a display based on the one or more second images;
   randomly selecting a colored light from a plurality of colored light options;
   flashing at least one of the display and a flash with the randomly selected colored light; and
   capturing one or more third images of the face of the user while flashing with the randomly selected colored light.

2. The one or more non-transitory computer-readable media of claim 1, wherein flashing further comprises:
   determining a randomized blinking pattern; and
   flashing the display or the flash in accordance with the randomized blinking pattern.

3. The one or more non-transitory computer-readable media of claim 2, wherein capturing one or more third images further comprises:
   capturing reflections from three dimensional contours of the face of the user while flashing in the randomized blinking pattern and with the randomly selected colored light; and
   discerning flat surfaces from the three dimensional contours of the face.

4. The one or more non-transitory computer-readable media of claim 3, wherein the method further comprises:

estimating the distance between the display and the face of the user based on the captured reflections.

5. The one or more non-transitory computer-readable media of claim 3, wherein the method further comprises:
   recording a start time Ts at the moment of each flash;
   recording an end time Te at the end of capturing the reflections;
   determining a threshold time Tth by adding an expected threshold latency to the start time Ts; and
   comparing the end time Te to the threshold time Tth.

6. The one or more non-transitory computer-readable media of claim 5, wherein the method further comprises:
   when the end time Te is greater than the threshold time Tth, restarting authenticating the user.

7. One or more non-transitory computer-readable media storing computer-executable instructions that, when executed by a processor, operate to perform a password-less method for authenticating a user, the method comprising:
   capturing one or more first images of a face of a user;
   comparing the one or more first images with a previously collected face template;
   capturing one or more second images of the face of the user; and
   presenting a password-less challenge to the user on a display based on the one or more second images, wherein presenting the password-less challenge further comprises:
      displaying a secret image on the display, wherein the secret image is a shared secret with the user;
      displaying a modified version of the secret image on the display; and
      moving the secret image toward the modified version of the secret image on the display by processing the one or more captured second images of the face of the user.

8. The one or more non-transitory computer-readable media of claim 7, wherein the method further comprises:
   establishing a protected audio video path (PAVP) session on a PAVP enabled device;
   storing the secret image in a PAVP encrypted frame buffer;
   recognizing the face of the user in the previously collected face template; and
   binding the recognized face to the PAVP enabled device;
   wherein displaying the secret image, displaying the modified version of the secret image, and moving the secret image are performed using the PAVP enabled device.

9. The one or more non-transitory computer-readable media of claim 7, wherein presenting the password-less challenge further comprises:
   displaying a plurality of images on the display, including the secret image and the modified version of the secret image;
   sensing, based on the one or more captured second images of the face of the user, when the user selects the secret image;
   moving, based on the one or more captured second images of the face of the user, the selected secret image until it substantially overlaps the modified version of the secret image; and
   blinking the modified version of the secret image.

10. The one or more non-transitory computer-readable media of claim 1, wherein the method further comprises:
    if the face of the user matches the previously collected face template and the password-less challenge is passed, granting authorized access to the user.

11. The one or more non-transitory computer-readable media of claim 1, wherein the method further comprises:
    after matching the face of the user with the previously collected face template, tracking the face of the user within a camera's view.

12. A device, comprising:
    a display;
    a camera;
    an image capture section to capture one or more first images of a face of a user using the camera;
    a comparator section to compare the one or more first images with a face template; and
    a challenge section to present a password-less challenge to the user on the display;
    wherein the challenge section further comprises a colored light selector to randomly select a colored light from a plurality of colored light options;
    wherein the display is configured to flash with the randomly selected colored light; and
    wherein the image capture section is configured to capture one or more third images of the face of the user while the display flashes the randomly selected colored light.

13. The device of claim 12, wherein the challenge section further comprises:
    a pattern selector to determine a randomized blinking pattern; and wherein the display is configured to flash in accordance with the randomized blinking pattern.

14. The device of claim 13, wherein the image capture section is configured to capture reflections from three dimensional contours of the face of the user while the display flashes in the randomized blinking pattern with the randomly selected colored light.

15. A device comprising:
    a display;
    a camera;
    an image capture section to capture one or more first images of a face of a user using the camera;
    a comparator section to compare the one or more first images with a face template; and
    a challenge section to present a password-less challenge to the user on the display;
    wherein the image capture section is configured to capture one or more second images;
    wherein the password-less challenge is based on the one or more captured second images;
    wherein the display is a protected audio video path (PAVP) enabled display;
    wherein the challenge section further comprises a PAVP encrypted frame buffer to store a secret image and a modified version of the secret image, wherein the secret image is a shared secret with the user; and
    wherein the challenge section is configured to display the secret image on the PAVP enabled display and move the secret image toward the modified version of the secret image responsive to the one or more captured second images of the face of the user.

16. The device of claim 15, wherein the PAVP enabled display is configured to display images in addition to the secret image and the modified version of the secret image.

17. The device of claim 12, further comprising:
    an authentication section configured to authenticate the user responsive to a successful result of the comparator section and the challenge section.

18. One or more non-transitory computer-readable media storing computer-executable instructions that, when executed by a processor of a device, operate to perform a password-less method for authenticating a user, the method comprising:
    capturing one or more first images of a face of a user using a camera of the device;

comparing the one or more first images with a face template;

capturing one or more second images; and presenting a password-less challenge to the user on a protected audio video path (PAVP) enabled display of the device, wherein the password-less challenge is based on the one or more captured second images; and wherein the operation of presenting the password-less challenge to the user on the PAVP enabled display comprises:

using a PAVP encrypted frame buffer to store a secret image and a modified version of the secret image, wherein the secret image is a shared secret with the user; and displaying the secret image on the PAVP enabled display and moving the secret image toward the modified version of the secret image responsive to the one or more captured second images of the face of the user.

19. The one or more non-transitory computer-readable media of claim 18, wherein the method further comprises:

using a transport layer security (TLS) connection between the device and a remote server to obtain the secret image from the remote server.

20. The one or more non-transitory computer-readable media of claim 1, wherein:

the method further comprises using a protected audio video path (PAVP) encrypted frame buffer to store a secret image, wherein the secret image is a shared secret with the user; and the operation of presenting the password-less challenge to the user comprises displaying the secret image on a PAVP enabled display.

21. The device of claim 14, wherein the image capture section is configured to estimate the distance between the display and the face of the user based on the captured reflections.

22. The device of claim 21, wherein the image capture section is configured to perform operations comprising:

recording a start time Ts at the moment of each flash;

recording an end time Te at the end of capturing the reflections;

determining a threshold time Tth by adding an expected threshold latency to the start time Ts; and comparing the end time Te to the threshold time Tth.

23. The device of claim 12, further comprising:

an authentication section configured to grant authorized access to the user if the face of the user matches the previously collected face template and the password-less challenge is passed.

24. The device of claim 12, wherein the image capture section is configured to perform operations comprising:

capturing reflections from three dimensional contours of the face of the user while the display is flashing; and discerning flat surfaces from the three dimensional contours of the face.

25. The one or more non-transitory computer-readable media of claim 7, wherein the method further comprises:

randomly selecting a colored light from a plurality of colored light options;

flashing at least one of the display and a flash with the randomly selected colored light; and capturing one or more third images of the face of the user while flashing with the randomly selected colored light.

26. The one or more non-transitory computer-readable media of claim 7, wherein the method further comprises:

determining a randomized blinking pattern;

flashing at least one of the display and a flash in accordance with the randomized blinking pattern; and capturing one or more third images of the face of the user while flashing.

27. The device of claim 15, further comprising:

an authentication section configured to authenticate the user responsive to a successful result of the comparator section and the challenge section.

* * * * *